United States Patent

Ogihara et al.

Patent Number: 6,044,569
Date of Patent: Apr. 4, 2000

[54] MEASURING METHOD AND MEASURING INSTRUMENT

[75] Inventors: Motonori Ogihara; Nobuhiro Ishikawa, both of Tsukuba; Takashi Noda, Utsunomiya, all of Japan

[73] Assignee: Mitutoyo Corporation, Tokyo, Japan

[21] Appl. No.: 09/021,543

[22] Filed: Feb. 10, 1998

[30] Foreign Application Priority Data

Feb. 10, 1997 [JP] Japan ................................. 9-026574
Mar. 10, 1997 [JP] Japan ................................. 9-054937

[51] Int. Cl.$^7$ .............................. G01B 21/20; G01B 5/00
[52] U.S. Cl. ................................ 33/503; 33/504; 33/556; 33/561
[58] Field of Search ............................. 33/503, 504, 556, 33/558, 559, 561

[56] References Cited

U.S. PATENT DOCUMENTS

| | | | |
|---|---|---|---|
| 4,333,238 | 6/1982 | McMurty | 33/503 |
| 4,362,978 | 12/1982 | Pollard et al. | 318/568 |
| 4,769,763 | 9/1988 | Trieb et al. | 33/504 |
| 5,408,758 | 4/1995 | Mizutani et al. | 33/503 |
| 5,425,180 | 6/1995 | Breyer | 33/503 |
| 5,471,406 | 11/1995 | Breyer et al. | 33/503 |
| 5,657,549 | 8/1997 | Shen et al. | 33/503 |

FOREIGN PATENT DOCUMENTS

| | | |
|---|---|---|
| 0147529 | 4/1988 | European Pat. Off. |
| 0073495 | 3/1989 | European Pat. Off. |
| 0420416 | 4/1991 | European Pat. Off. |
| WO9220096 | 11/1992 | WIPO |

OTHER PUBLICATIONS

Weck M. et al., "On–Line–Vermessung Von Werkstucken Im Robotergreifer On–Line Measurement of Components in the Robot Gripper", Jul. 7, 1994, *ZWF Zeitschrift fur Wirtschaftliche Fertigung Under Automatisierung*, vol. 89, NR. 7/08, pp. 400/401.

Muller G., "Koordinaten–Messgerate Nachrusten Retrofitting Coordinate Measuring Equipment", Mar. 1, 1995, *Werkstatt Und Betrieb*, vol. 128, NR. 3, pp. 161/162, 165/166.

Wocke P. KMG Automatisch Programmieren Generierung. Vidsualizierung Und Modifizierung Von Anatastpunkten Und Verfahrwegen, Apr. 1, 1994, *F & M. Feinwerktechnik Mikrotechnik Messterchnik*, vol. 102, NR. 4, pp. 181–186.

*Primary Examiner*—Randy W. Gibson
*Attorney, Agent, or Firm*—Webb Ziesenheim Logsdon Orkin & Hanson, P.C.

[57] ABSTRACT

In a measuring method with a probe (a touch trigger probe 70), a velocity V1 and a coordinate value P1 of the prove trigger probe 70 are detected when a contact-detection signal is generated from the probe 70, and then a coordinate value P0 at the moment of contact is found from the coordinate value P1, the velocity V1, and an elapsed time T1 of the touch trigger prove 70 since the contact detection (an elapsed time from the contact until the contact-detection signal is generated).

16 Claims, 14 Drawing Sheets

CORRECTION TABLE (UNIT: $\mu$m)

| VELOCITY | PROBE A | | | PROBE B | | | --- |
|---|---|---|---|---|---|---|---|
| (mm/s) | X-AXIS | Y-AXIS | Z-AXIS | X-AXIS | Y-AXIS | Z-AXIS | X-AXIS |
| 0.5 | 6.3 | 4.2 | 0.1 | 5.2 | 3.8 | 0.1 | --- |
| 1.0 | 3.2 | 2.3 | 0.1 | 3.0 | 2.0 | 0.1 | --- |
| 1.5 | 2.1 | 1.5 | 0.1 | 1.9 | 1.3 | 0.1 | --- |
| 2.0 | 1.4 | 0.8 | 0.1 | 1.2 | 0.6 | 0.0 | --- |
| 2.5 | 0.3 | 0.2 | 0.1 | 0.2 | 0.2 | 0.0 | --- |
| 3.0 | 0.0 | 0.0 | 0.0 | 0.0 | 0.0 | 0.0 | --- |

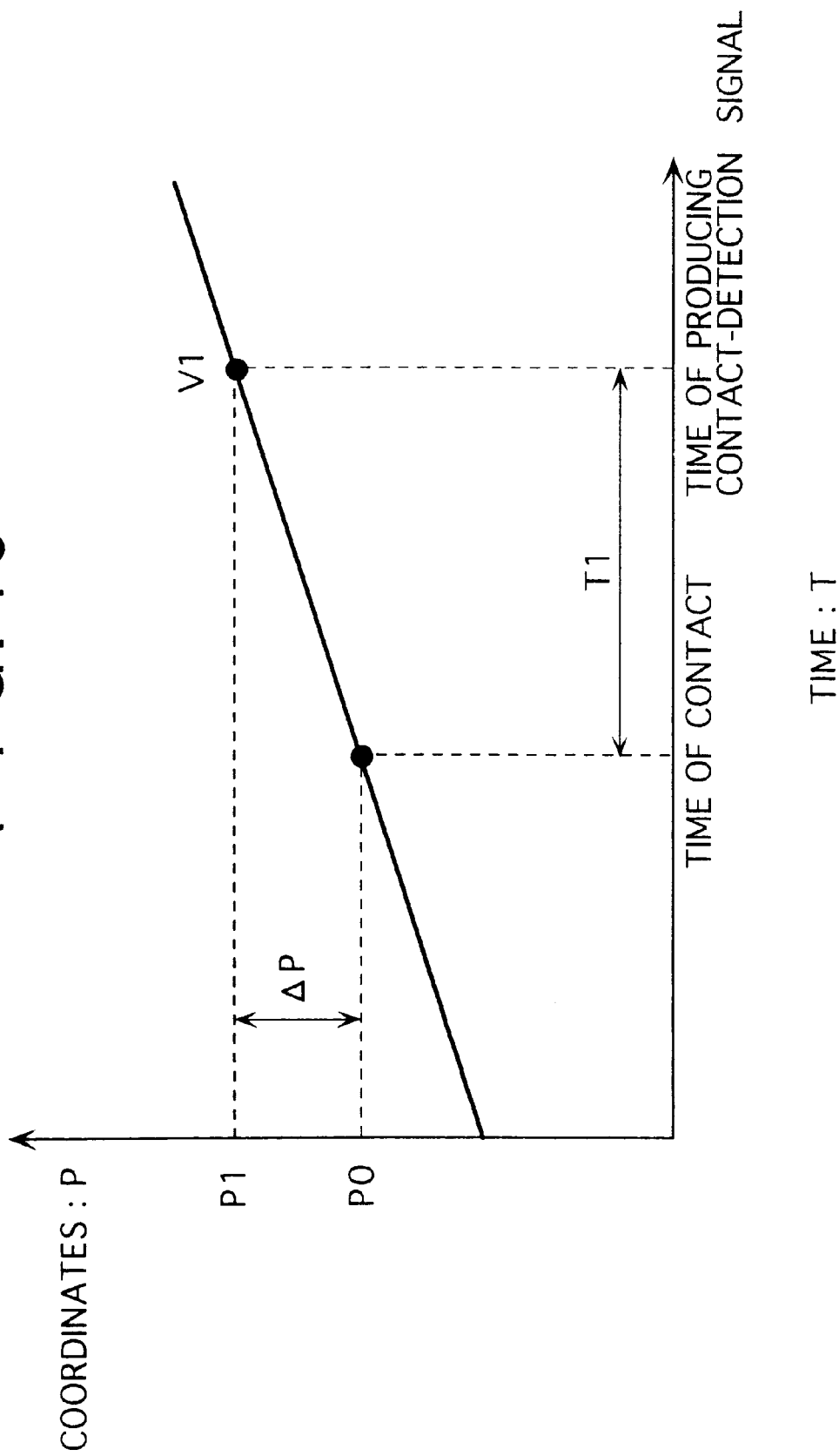

MEASURING METHOD AND MEASURING INSTRUMENT

BACKGROUND OF THE INVENTION

1. Field of the Invention

This invention relates to a measuring method and a measuring instrument for measuring, for example, the size or the surface shape of an object (to be measured) with a probe.

2. Description of the Related Art

In a coordinate measuring machine, for example, a three-dimensional measuring instrument, a touch trigger probe is allowed to contact an object (to be measured) during the relative movement of the touch trigger probe and the pre-measured (throughout this application the word "pre-measured" means "to be measured") object in three-dimensional directions. Each coordinates of axes (of three-dimensional directions) is read in response to a contact-detection signal output from the touch trigger probe at the contact between the touch trigger probe and the pre-measured object. And then the size or configuration of the pre-measured object is obtained from these coordinates.

Conventionally, two types of touch trigger probe are known for using them in the coordinate measuring machine or the like: a touch trigger probe having a structure such that three pins, formed with a measuring point integrally, are supported with six balls or pins, that is to say a structure such that the measuring point is supported by a six-point contact type seating system; and a touch trigger probe having a structure such that a vibrated measuring-point is contacted on a measured object and the contact with the pre-measured object is detected by sensing the decrease of the vibration.

As shown in FIG. 13, the former touch trigger probe includes, for example, a probe body 4, a measuring point 1 having a contacting ball at the end which is supported in the probe body 4 by the medium of the six-point contact type seating system 8, and a pressing means 7 for forcibly pressing the measuring point 1 to the seating system 8, such as a spring or the like.

The seating system 8 consists of: a movable portion 2 secured on the base end of the measuring point 1; three pins 3 projected from the circumferential face of the movable portion 2, perpendicular to the axis of the measuring point 1, in radial at 120 degrees about the axis of the measuring point 1; and three V-shaped engaging portion 6 each of which is a combination of two pins (or balls) arranged in a V shape, and is secured on a bottom wall 5 of the probe body 4 to correspond to the pin 3.

In the above structure, when the movable portion 2 is pressed toward the bottom wall 5 of the probe body 4 by the pressing means 7, the movable portion 2 stands at a predetermined position. Here, the pin 3 provided on the movable portion 2 is in contact with the two points of the V-shaped engaging portion 6, in total, the pins 3 are in contact with the six points, so that this system is called the six-point contact type seating system.

As shown in FIG. 14, the later touch trigger probe includes a stylus holder 12, a vibrator 14 as a measuring point which is supported in the stylus holder 12 with a pin 18 at the central area thereof, and two piezoelectric elements 16 placed in the periphery of a node of vibration (i.e. a portion of vibrating object which does not vibrate in view of certain frequency) of the vibrator 14 and secured to a recess 20 with an adhesive or the like.

The vibrator 14 has a contacting portion 14A connecting the pre-measured object at the end and a balancer 14B, having the same weight as the contacting portion 14A, at the other end, and is supported in the stylus holder 12 at the node of vibration. The balancer 14B is provided in order to keep the vibrator 14 in weight-balance not to deviate the node of vibration from the center of the vibrator 14 in the resonance by reason of the contacting portion 14A placed at the end of the vibrator 14, and in order not to receive the moment of rotation about the fulcrum when the touch trigger probe moves in a perpendicular direction to the vibrating direction of the vibrator 4 and receives the acceleration.

As shown in FIG. 15, the piezoelectric element 16 is split into a vibration applying electrode 16A for applying vibration to the vibrator 14 in a reciprocating vibration and a detecting electrode 16B for detecting the reciprocating vibration of the vibrator 14 as an electric AC signal. The vibration applying electrode 16A is connected through a signal line 22A to a drive circuit 24 for vibrating the vibrator 14. The detecting electrode 16B is connected through a signal line 22B to a detection circuit 26 for detecting the vibration of the vibrator 14. A signal from the detection circuit 26 is send through a signal line 22D to the drive circuit 24. Thereby, a feedback loop is designed to amplify an electric signal, fetched from the detecting electrode 16B, in the detection circuit 26 and the drive circuit 24, and sent it to the vibration applying electrode 16A.

The detection circuit 26 is connected to a touch trigger signal producing circuit 28. In the touch trigger signal producing circuit 28, an AC signal from the detecting electrode 16B is full-wave rectification, and the rectified signal is compared with a reference value after being converted to a DC signal through a low-pass filter, and then a touch trigger signal is sent out at the time when the detecting signal reaches the reference value.

In the conventional touch trigger probe, however, any structure is at a disadvantage in that a measurement error is contributed by a relative moving velocity at the moment of contact with the pre-measured object, namely, the contact velocity.

In the former touch trigger probe (shown in FIG. 13), the measurement error is large when the relative moving velocity to the pre-measured object is especially small. As one of the reasons, the contact velocity at the instant of contact between the touch trigger probe and the pre-measured object is generally approximately from 3 mm/s to 20 mm/s. It has been shown that when the touch trigger probe contacts the pre-measured object at a speed exceeding the range, the measured value shows a comparatively stable value, but when the touch trigger probe contacts the pre-measured object at a speed below the range, a gap between the coordinates, fetched when a contact-detection signal is generated, and the actual coordinates is produced.

In this point, there is no obvious ground. In the structure of the touch trigger probe shown in FIG. 13, when the measuring point 1 is displaced by contacting the pre-measured object, at least one of six pins (or balls) is in the non-contact state, and this state is detected electrically. When the measuring point 1 is relatively displaced in a low velocity, the amount of flexure prior to separation of the contact is concluded to be larger.

On the other hand, in the later touch trigger probe (shown in FIGS. 14 and 15), the contact-detection sensitivity is higher compared with that in the former touch trigger probe, so that the measurement error in the low-speed area seldom tends toward increase. However, the detection and drive circuits subsequent to the piezoelectric elements are complicated, so that an elapsed time from the contact between contacting portion 14A of the vibrator 14 and the pre-measured object to the output of the touch trigger signal (the contact-detection signal) is longer, therefore the elapsed time causes the measurement error.

For example, as show in FIG. 16, from the contact between the contacting portion 14A of the vibrator 14 and the pre-measured object, when the contact-detection signal is generated after an elapsed time T1, a coordinate value P1, which is ΔP distance from an coordinate value P0 at the moment of actual contact between the connecting point 14A and the pre-measured object, is determined as the coordinate value at the moment of actual contact.

The amount of correction can be defined for correcting the amount of deviation ΔP in advance if the measuring speed is uniform, but the amount of deviation changes in response to the changing of the measuring speed. Especially, in the measuring instrument in which a high speed and high precision are essential, the measurement should be carried out by changing the measuring speed, so that the correction is not carried out rightly.

It should be mentioned that the above disadvantage occurs not only in the touch trigger probe but also in a non-contacting probe.

For example, where the size of the pre-measured object is measured with a non-contacting probe, having an optical displacement sensor for moving an objective lens close to and apart from a measured face of the pre-measured object to focus a focal point of the objective lens on the measured face, or a non-contacting probe of a camera or the like, relative coordinates of the prove and the pre-measured object are fetched when a distance between the non-contacting probe and the pre-measured object is fixed. In this time, a disadvantage that the measurement error is contributed by the relative moving velocity of the prove and the pre-measured object occurs.

It is an object of the present invention to resolve the conventional disadvantages and to provide a measuring method and a measuring instrument, capable of achieving a high-accurate and efficient measurement and of correcting a biased error caused by a measuring speed even in a complicated measurement which requires changing the measuring speed in response to the substance of measuring.

SUMMARY OF THE INVENTION

A measuring method of the present invention, in which a measured object and a probe, producing a position-detection signal by the relation with the pre-measured object, are relatively moved, and a relative moving coordinate value of the probe and the pre-measured object is detected in response to the position-detection signal output from the probe, and then at least one of a size and a surface shape of the pre-measured object is measured on the basis of the relative moving coordinate value, is characterized by including the steps of: detecting the relative moving coordinate value of the probe and the pre-measured object, and a relative moving velocity of the probe and the pre-measured object in response to the position-detection signal from the probe; and correcting the relative moving coordinate value in the detecting step with the amount of correction derived from the relative moving velocity in the detecting step.

A measuring instrument of the present invention, in which a measured object and a probe, producing a position-detection signal by the relation with the pre-measured object, are relatively moved, and a relative moving coordinate value of the probe and the pre-measured object is detected in response to the position-detection signal output from the probe, and then at least one of a size and a surface shape of the pre-measured object is measured on the basis of the relative moving coordinate value, is characterized by including: a coordinate value detecting means for detecting the relative moving coordinate value of the probe and the pre-measured object in response to the position-detection signal from the probe; a velocity detecting means for detecting a relative moving velocity of the probe and the pre-measured object when the coordinate value detecting means detects the relative moving coordinate value; and a correction means for correcting the relative moving coordinate value at the moment of contact with the amount of correction derived from the relative moving velocity at the moment of contact.

In the above structure, when the probe and the pre-measured object are relatively moved, the relative moving coordinate value of the probe and the pre-measured object is detected in response to the position-detection signal from the probe, and at the same time, the relative moving velocity of the probe and the pre-measured object is detected, and then the relative moving coordinate value is corrected with the amount of correction derived from the relative moving velocity.

A measurement error caused by the relative moving velocity of the prove and the pre-measured object is automatically corrected, therefore a high-accurate and efficient measurement is achieved even in a complicated measurement which requires changing the measuring speed in response to the substance of measuring.

In the above described, the probe may be a contact type probe which the contact-detection signal is generated by contacting the pre-measured object, or a non-contacting probe which has an optical displacement sensor for moving an objective lens close to and apart from a measured face of the pre-measured object to focus a focal point of the objective lens on the measured face, or the non-contacting probe of a camera or the like.

Where a contact type, namely a touch trigger probe is used as the probe, the following structure is preferable.

A measuring method, in which a touch trigger probe and an object contact during the relative movement, and a relative moving coordinate value of the touch trigger probe and the pre-measured object is detected in response to a contact-detection signal, produced from the touch trigger probe at the contact between the touch trigger probe and the pre-measured object, and then at least one of a size and a surface shape of the pre-measured object is measured on the basis of the relative moving coordinate value, is characterized by including the steps of: detecting the relative moving coordinate value of the touch trigger probe and the pre-measured object, and a relative moving velocity of the touch trigger probe and the pre-measured object, at the time when the contact-detection signal is generated from the touch trigger probe; and correcting the relative moving coordinate value, at the time when the contact-detection signal is generated, with the amount of correction derived from the relative moving velocity at the time when the contact-detection signal is generated.

A measuring instrument, in which a touch trigger probe and a measured object contact during the relative movement, and a relative moving coordinate value of the touch trigger probe and the pre-measured object is detected in response to a contact-detection signal, produced from the touch trigger probe at the contact between the touch trigger probe and the pre-measured object, and then a size or a surface shape of the pre-measured object is measured on the basis of the relative moving coordinate value, is characterized by including: a coordinate value detecting means for a relative moving coordinate value of the touch trigger probe and the pre-measured object when the contact-detection signal is generated from the touch trigger probe; a velocity detecting means for detecting a relative moving velocity of the touch trigger probe and the pre-measured object when the contact-detection signal is generated from the touch trigger probe; and a correction means for correcting the relative moving coordinate value, at the time when the contact-detection signal is generated, with the amount of correction derived from the relative moving velocity at the time when the contact-detection signal is generated.

In the above structure, when the touch trigger probe and the pre-measured object contact during the relative movement, the contact-detection signal is generated from the touch trigger probe. In this time, the relative moving coordinate value of the touch trigger probe and the pre-measured object and the relative moving velocity of the touch trigger probe and the pre-measured object are detected. And then the relative moving coordinate value is corrected with the amount of correction derived from the relative moving velocity.

A measurement error caused by the relative moving velocity of the touch trigger prove and the pre-measured object is automatically corrected, therefore a high-accurate and efficient measurement is achieved even in a complicated measurement which requires changing the measuring speed in response to the substance of measuring.

In order to detect the relative moving coordinate value of the touch trigger probe and the pre-measured object when the contact-detection signal is generated, for example, a coordinate value detecting means, which has a displacement detector, detecting the relative moving coordinate value of the touch trigger probe and the pre-measured object, and a coordinates storage portion storing the relative moving coordinate value, at the time when the contact-detection signal is generated from the touch trigger probe, of the relative moving coordinate values detected by the displacement detector, can be used.

Incidentally, a displacement detector of a magnetic type, capacitance type, photoelectric type or the like can be used as the displacement detector. A counter or the like can be used as the coordinates storage portion.

In order to detect the relative moving velocity of the touch trigger probe and the pre-measured object when the contact-detection signal is generated, a velocity detector, such as a tacho-generator (or a tachometer: i.e. a device which generates certain signal in accordance with a revolution of a revolving shaft), can be used. Alternatively, the relative moving coordinate value of the touch trigger probe and the pre-measured object is detected at fixed intervals, and then the relative moving velocity at the time when the contact-detection signal is generated can be estimated from more than two relative moving coordinate values detected and the fixed intervals.

For example, when more than two relative moving coordinate values, at the time the relative moving coordinate value of the touch trigger probe and the pre-measured object are detected at a fixed interval T2, are defined as $P_n$ and $P_{n-1}$, the mean velocity $V_n$ is found from:

$$V_n = (P_n - P_{n-1})/T2$$

and then the mean velocity $V_n$ may be estimated as a relative moving velocity V1 at the time when the contact-detection signal is generated.

More specifically, it is advisable that the structure has: a displacement detector detecting the relative moving coordinate value of the touch trigger probe and the pre-measured object; a fixed interval signal producing portion; a first coordinate storage portion for sequentially storing the relative moving coordinate values, detected in the displacement detector, at fixed intervals of signals, output from the fixed interval signal producing portion, and obtaining the relative moving coordinate value; a second coordinate storage portion for storing a relative moving coordinate value antecedent to the relative moving coordinate value, obtained by the first coordinate storage portion, for the fixed interval; and a velocity computing portion for finding the relative moving velocity, at the time when the contact-detection signal is generated, from the fixed interval and the relative moving coordinate values stored in the first and second coordinate storage portion.

In this point, the velocity detector, such as the tacho-generator, is not needed, thereby achieving the simplification and small cost.

Concerning a method for finding the amount of correction derived from the relative moving velocity at the time when the contact-detection signal is generated, a natural elapsed time of the touch trigger probe, from the contact between the touch trigger probe and the pre-measured object until the contact-detection signal is generated, is stored in advance; and the amount of correction can be computed from the relative moving velocity at the time when the contact-detection signal is generated and the elapsed time.

For example, when the natural elapsed time of the touch trigger probe is T1, the correction amount $\Delta P$ is found as:

$$\Delta P = K1 \cdot V1 \cdot T1$$

(K1 is the constant, character "·" means multiplication)
Then, the relative moving coordinate value P1 at the time the contact-detection signal is generated is corrected with the correction amount $\Delta P$ to determined the relative moving coordinate value P0 at the moment of contact. That is to say, the relative moving coordinate value P0 at the moment of contact is found from:

$$P0 = P1 - \Delta P$$

Irrespective of the natural elapsed time of the touch trigger probe and the relative moving velocity at the time the contact-detection signal is generated, the accurate measurement is achieved.

As another method for finding the amount of correction derived from the relative moving velocity at the time when the contact-detection signal is generated, the relationship between the relative moving velocity of the touch trigger probe and the pre-measured object and the amount of correction, derived from the relative moving velocity, is stored in a correction table in advance; and then the amount of correction, corresponding to the relative moving velocity at the time when the contact-detection signal is generated, is found from the correction table.

Irrespective of the relative moving velocity at the time the contact-detection signal is generated, the accurate measurement is achieved also.

In this point, where the relative moving velocity, at the time when the contact-detection signal is generated, is in relative moving velocities stored in the correction table, the amount of correction, corresponding to the relative moving velocity at the time when the contact-detection signal is generated, can be computed with the amount of correction, corresponding to the stored relative moving velocities which are positioned antecedent and subsequent to the relative moving velocity at the time when the contact-detection signal is generated, and with the stored relative moving velocities which are positioned antecedent and subsequent to the relative moving velocity at the time when the contact-detection signal is generated. The amount of correction can be computed by, for example, linear interpolation.

The correction amount derived from the relative moving velocity at the time when the contact-detection signal is generated is found further accurately.

As still another method for finding the amount of correction derived from the relative moving velocity at the time when the contact-detection signal is generated, the relationship between the relative moving velocity of the touch trigger probe and the pre-measured object and the amount of correction derived from the relative moving velocity is approximated with a function in advance; and then the amount of correction may be found by substituting the relative moving velocity, at the time when the contact-detection signal is generated, into the above function.

In the above structure, the aforementioned correction table is not needed, so that the structure is simplified at low cost.

In the description thus far, it is advisable that the relative moving coordinate value at the time when the contact-detection signal is generated is any one of a two-dimensional coordinate value and a three-dimensional coordinate value; the relative moving velocity at the time when the contact-detection signal is generated has a larger number of vector components than the same number of dimensions as the two-dimensional coordinate value or the three-dimensional coordinate value; and the relative moving coordinate value at the time when the contact-detection signal is generated is corrected with the elapsed time and each component value of the relative moving velocities at the time when the contact-detection signal is generated.

Alternatively, it is desirable that the relative moving coordinate value at the time when the contact-detection signal is generated is a coordinate value in two-dimension or three-dimension; the amount of correction in two-dimension or three-dimension is stored in the correction table to correspond to the relative moving velocity at the time when the contact-detection signal is generated; and the amount of correction in two-dimension or three-dimension, corresponding to the relative moving velocity at the time when the contact-detection signal is generated, is selected from the correction table.

This structure can be applied for a touch trigger probe where the measurement error is dependent upon the measuring direction.

Generally, the relationship between the measurement error and the relative moving velocity at the time when the contact-detection signal is generated differs in each touch trigger probe.

As a way for dissolving the above description, the natural elapsed time of each touch trigger probe is stored according to the type of touch trigger probe in advance; and then the amount of correction can be computed with the natural elapsed time of the touch trigger probe each time the touch trigger probe is changed.

Alternatively, the relationship between the relative moving velocity of the touch trigger probe and the pre-measured object and the amount of correction derived from the relative moving velocity is stored in the correction table in advance according to the type of trigger probe used; and then the amount of correction can be computed with the relationship between the amount of correction and the relative moving velocity corresponding to the type of touch trigger probe each time the touch trigger probe is exchanged.

BRIEF DESCRIPTION OF THE DRAWINGS

FIG. 16 is a graph for explaining about a natural delayed time of the aforementioned touch trigger probe.

DETAILED DESCRIPTION OF THE PREFERRED EMBODIMENT(S)

The preferred embodiments according to the present invention will be described below with reference to the accompanying drawings.

First Embodiment

Figure 1:
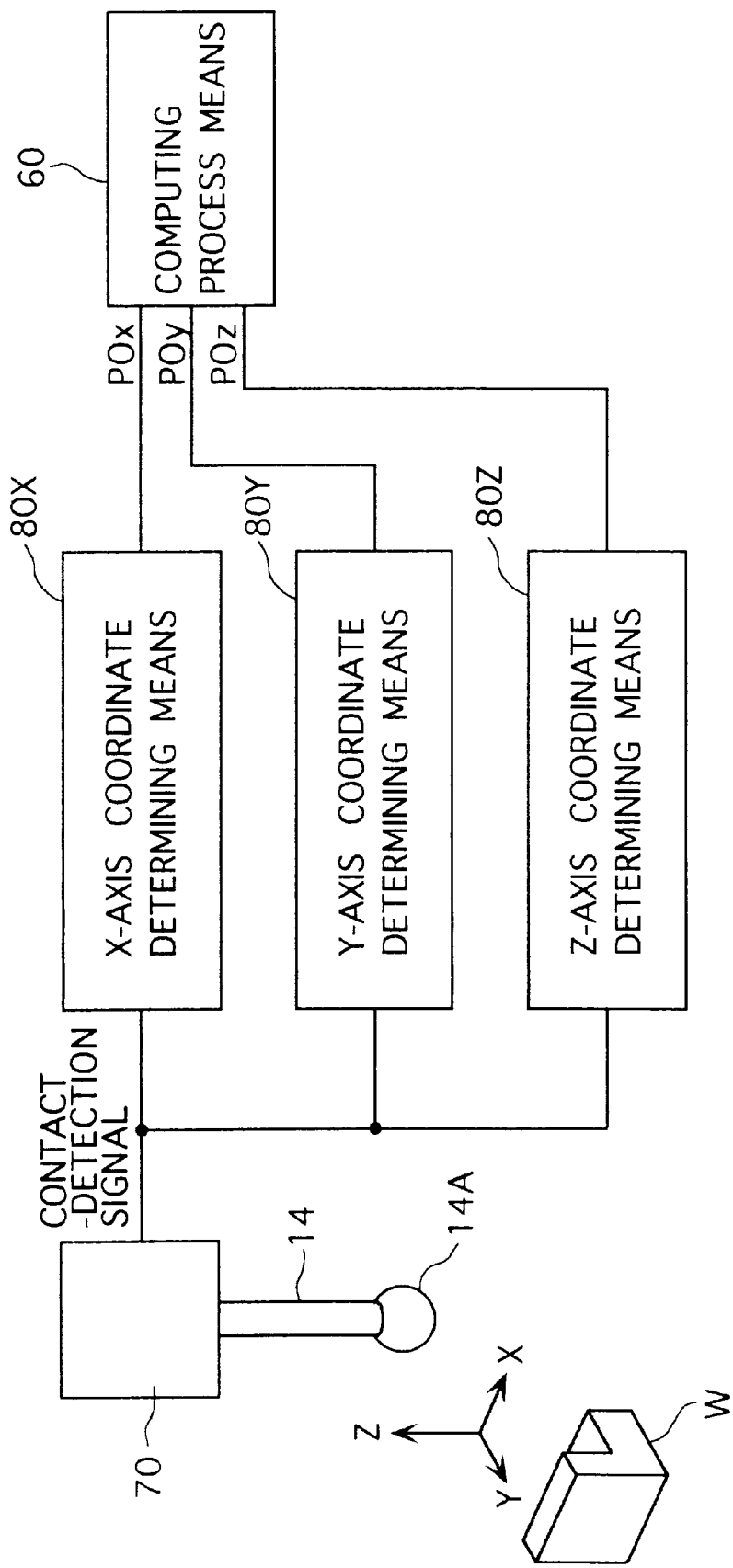
FIG. 1 is a block diagram showing a first embodiment according to the present invention.

FIG. 1 is an entire block diagram of a coordinate measuring machine according to the first embodiment. The coordinate measuring machine is composed of: a touch trigger probe 70 provided to be moved in three dimensional directions (the X-axis, Y-axis and Z-axis directions) by a three-dimensional moving system (not shown), and producing a position-detection signal from the positional relationship with an object W, in this case, a contact-detection signal by contacting the pre-measured object W; X-axis, Y-axis and Z-axis coordinate determining means 80X, 80Y and 80Z for determining the coordinates of the touch trigger probe in each axis direction; and a computing process means 60 for finding a size or configuration of the object W on the basis of the coordinate values P0x, P0y, and P0z which are respectively determined in the coordinate determining means 80X, 80Y and 80Z.

Figure 14:
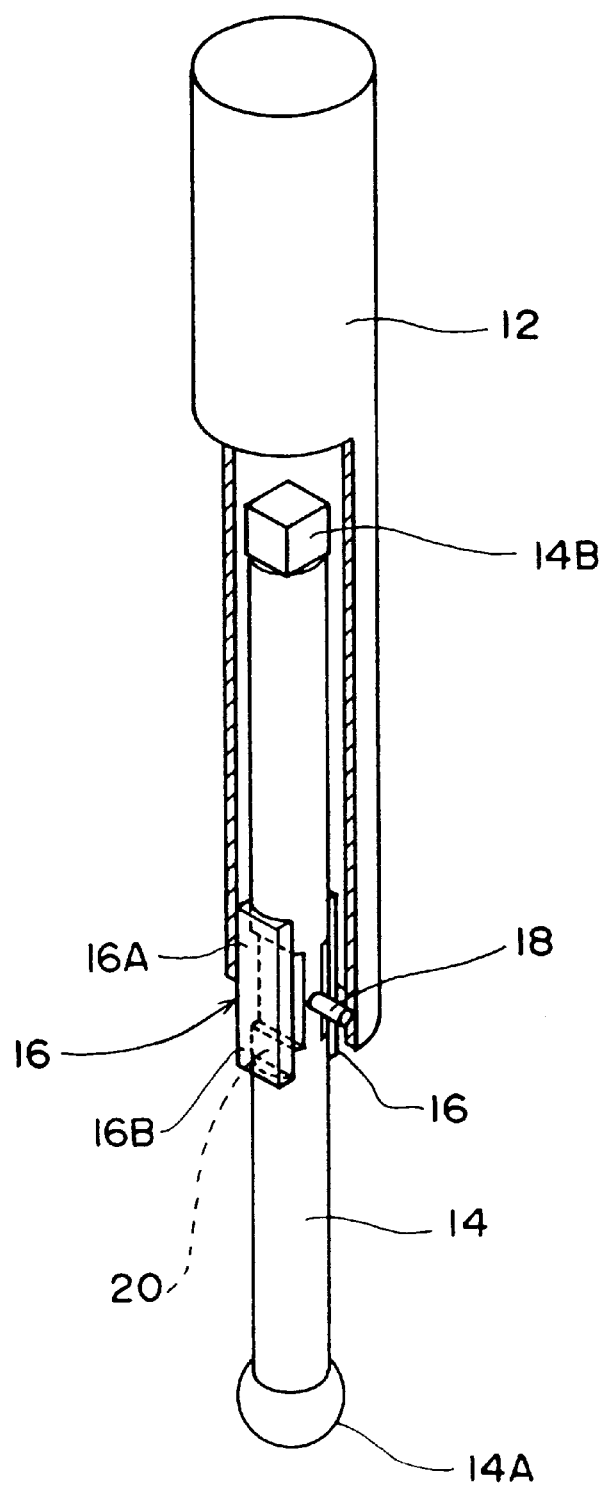
FIG. 14 is a cutaway view showing a vibration type touch trigger probe.
Figure 15:
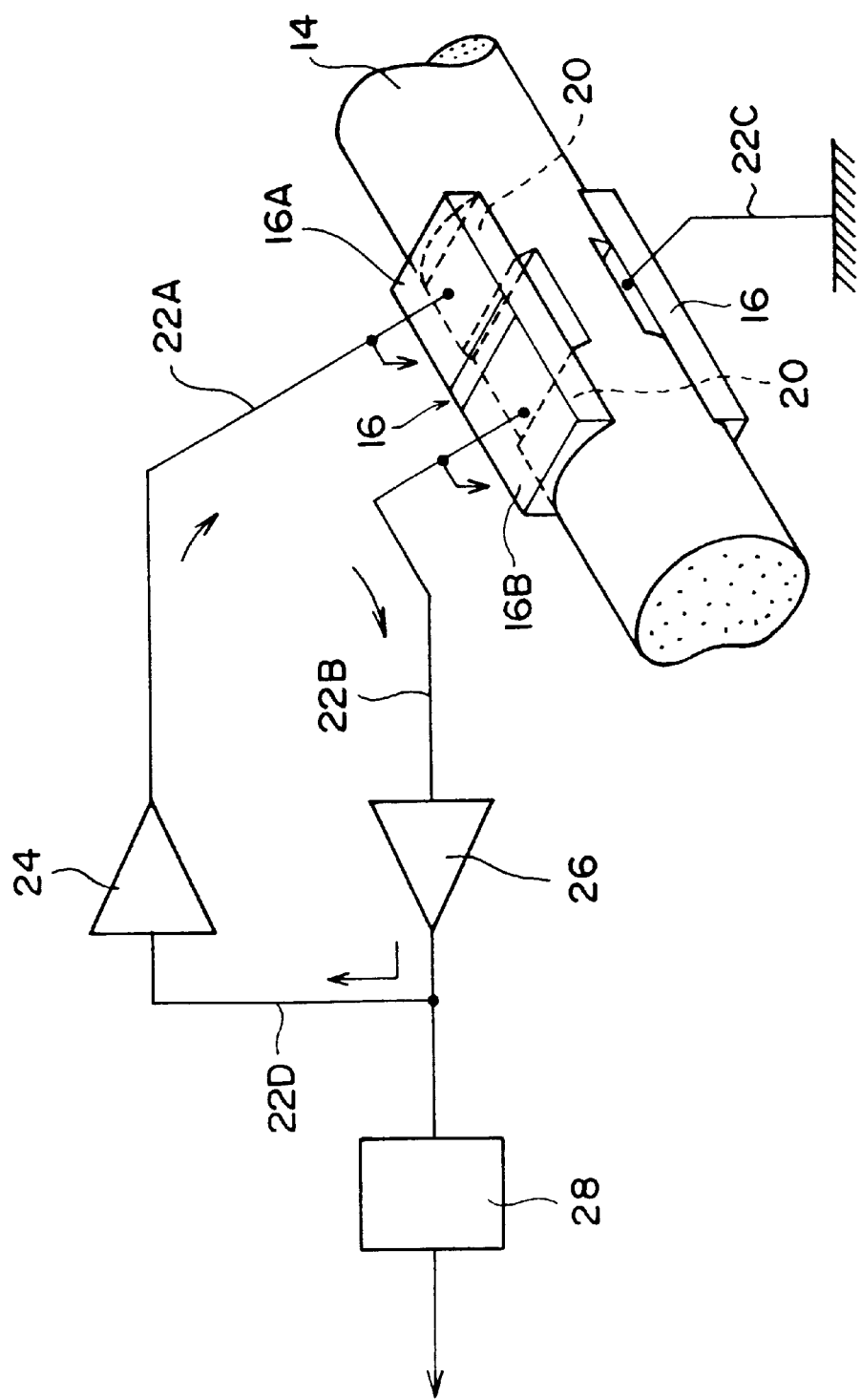
FIG. 15 is a diagram showing a detection drive circuit of the aforementioned touch trigger probe.

The aforementioned touch trigger probe 70 has the same structure as that of the touch trigger probe shown in FIGS. 14 and 15, so that the description is omitted. Note that the time from when the contacting portion 14A of the vibrator 14 contacts the object W to when the contact-detection signal is generated, namely, an elapsed time, is a touch trigger probe natural value and an approximately constant T1.

Figure 2:
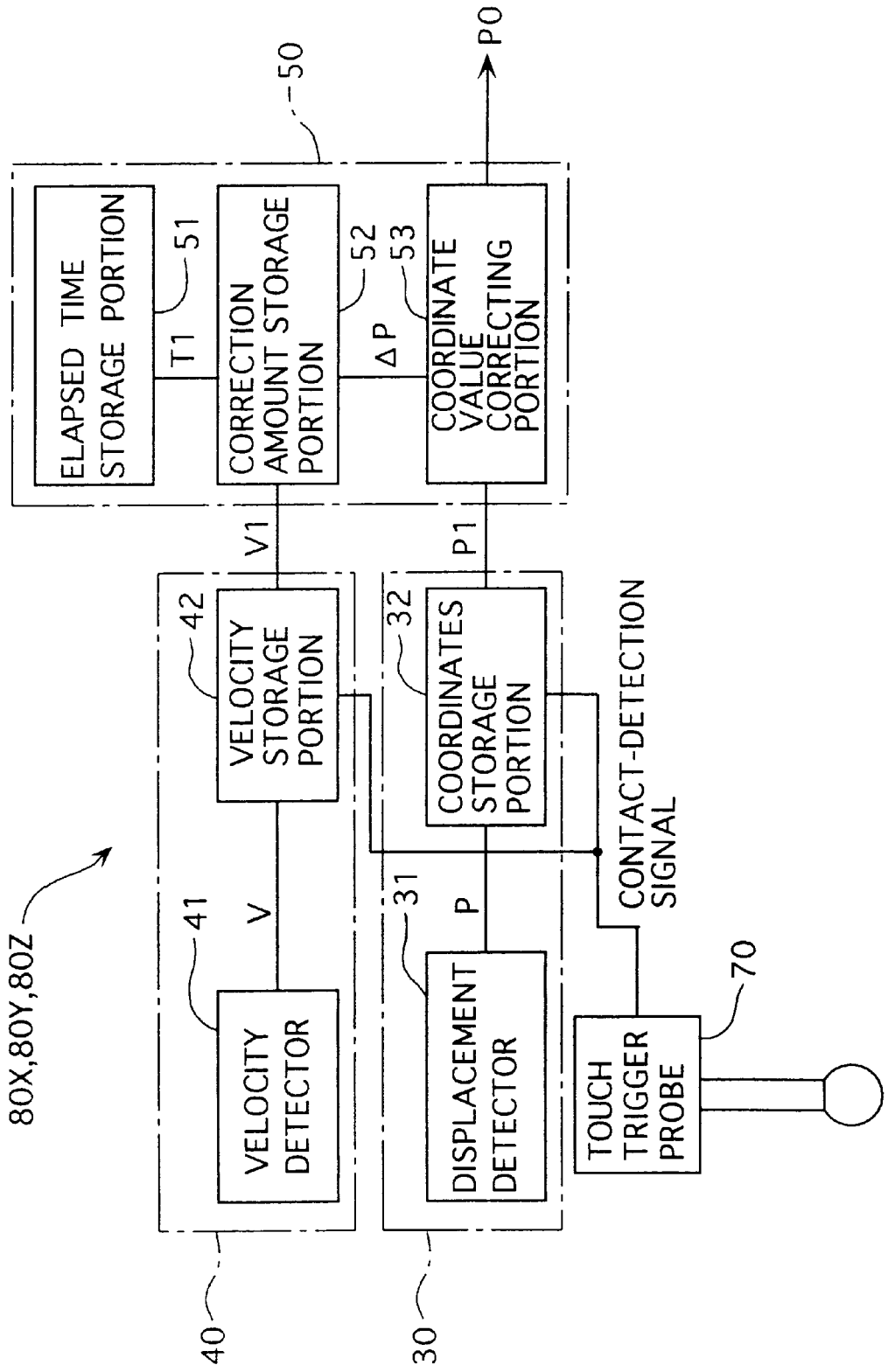
FIG. 2 is a block diagram showing a coordinate determining means in the first embodiment.

As shown in FIG. 2, each of the coordinate determining means 80X, 80Y and 80Z includes: a coordinate detecting means 30 for detecting a coordinate value P1 of the touch trigger probe 70 in an axis direction when the contact-detection signal is generated from the touch trigger probe 70; a velocity detecting means 40 for detecting a velocity V1 of the touch trigger probe 70 in an axis direction when the contact-detection signal is generated from the touch trigger probe 70; and a correction means 50 for finding a coordinate value P0, at the contact between the touch trigger probe 70 and the object W, from the coordinate value P1, the velocity V1 and the aforementioned elapsed time T1.

In turn, the coordinate detecting means 30 consists of: a displacement detector 31 which detects a move position (a coordinate value P) of the touch trigger probe 70 in an axis direction; and a coordinates storage portion 32 which fetches and stores the coordinate value P1, at the time when the contact-detection signal is generated from the touch trigger probe 70, from the coordinate values P detected in the displacement detector 31.

The velocity detecting means 40 consists of: a velocity detector 41, such as the tacho-generator, which detects a moving velocity of the three-dimensional moving system in an axis direction; and a velocity storage portion 42 which fetches and stores the detected velocity V1, at the time when the contact-detection signal is generated from the touch trigger probe 70, of the detected velocities V detected in the velocity detector 41.

The correction means 50 consists of: an elapsed time storage portion 51 which stores the natural delayed time of the touch trigger probe 70 T1 in advance; a correction amount computing portion 52 which computes a correction amount ΔP from the elapsed time T1, stored in the elapsed time storage portion 51, and the detected velocity V1 detected by the velocity detecting means 40; and a coordinate value correcting portion 53 which corrects the coordinate value P1, detected by the coordinate detecting means 30, with the correction amount ΔP, computed in the correction amount computing portion 52, to find the coordinate value P0 at the contact between the touch trigger probe 70 and the object W.

In the aforementioned structure, the touch trigger probe 70 contacts the object W while moving in three-dimensional directions. In response to the contact-detection signal produced from the touch trigger probe 70 when it contacts the object W, each coordinate value P1 (of P1x, P1y and P1z) of the touch trigger probe 70 in each axis direction is detected and stored in the coordinate value detecting means 30 for each axis, and additionally, each velocity V1 (of V1x, V1y and V1z) of the touch trigger probe 70 in each axis direction is detected and stored in the velocity detecting means 40.

In the correction means 50, the correction amount computing portion 52 finds the correction amount ΔP as a function of the velocity V1 and the elapsed time T1:

$$\Delta P = f(V1, T1)$$

For example, it is found as:

$$\Delta P = K1 \cdot V1 \cdot T1$$

(K1 is the constant)

Next, in the coordinate value correcting portion 53, the coordinate value P0 at the contact moment is found from the coordinate value P1 and the correction amount ΔP by the following computation:

$$P0 = P1 - \Delta P$$

In this point, the values (P, P1, P0, ΔP, V, V1, and K1) used in each means and computation have a dimension corresponding to a dimension of the coordinate measuring instrument. For example, in three dimension, the expression can be written as follows.

$$\begin{bmatrix} P0x \\ P0y \\ P0z \end{bmatrix} = \begin{bmatrix} P1x \\ P1y \\ P1z \end{bmatrix} - \begin{bmatrix} K1x & 0 & 0 \\ 0 & K1y & 0 \\ 0 & 0 & K1z \end{bmatrix} \cdot \begin{bmatrix} V1x \\ V1y \\ V1z \end{bmatrix} \cdot T1 \quad \text{Expression 1}$$

According to the first embodiment, when the touch trigger probe 70 contacts the object W and produces the contact-detection signal, the coordinate value P1 and the velocity V1 of the touch trigger probe 70 are detected, and then the coordinate value P0 at the contact between the touch trigger probe 70 and the object W is obtained from the coordinate value P1, the velocity V1 and the elapsed time T1, so that the biased error caused by the elapsed time T1 and the velocity V1 of the touch trigger probe 70 can be corrected.

More specifically, after the correction amount ΔP=K1·V1·T1 is found from the velocity V1 and the elapsed time T1, the coordinate value P0 at the contact moment is obtained from the coordinate value P1 and the correction amount ΔP by the computation:

$$P0 = P1 - \Delta P$$

so that the biased error, caused by the elapsed time since the contact detection and the contact velocity of the touch trigger probe 70, can be corrected even in the complicated measurement which requires changing the measuring speed in response to the substance of the measuring.

The relative moving velocity V1 at the time when the contact-detection signal is generated has a vector component of the same dimension (three dimension) as that of the coordinate values P1 and P0. Additionally, each component value of the relative moving coordinate value P0 at the contact moment is obtained by using the elapsed time T1 and each component value of the relative moving coordinate value P1 and the relative moving velocity V1 at the time when the contact-detection signal is generated. That is to say the correction is carried out with the three-dimensional vector quantities with respect to three-dimensional space, therefore the above structure can be applied to the touch trigger probe having the elapsed time since the contact detection varying from measuring directions.

Figure 3:
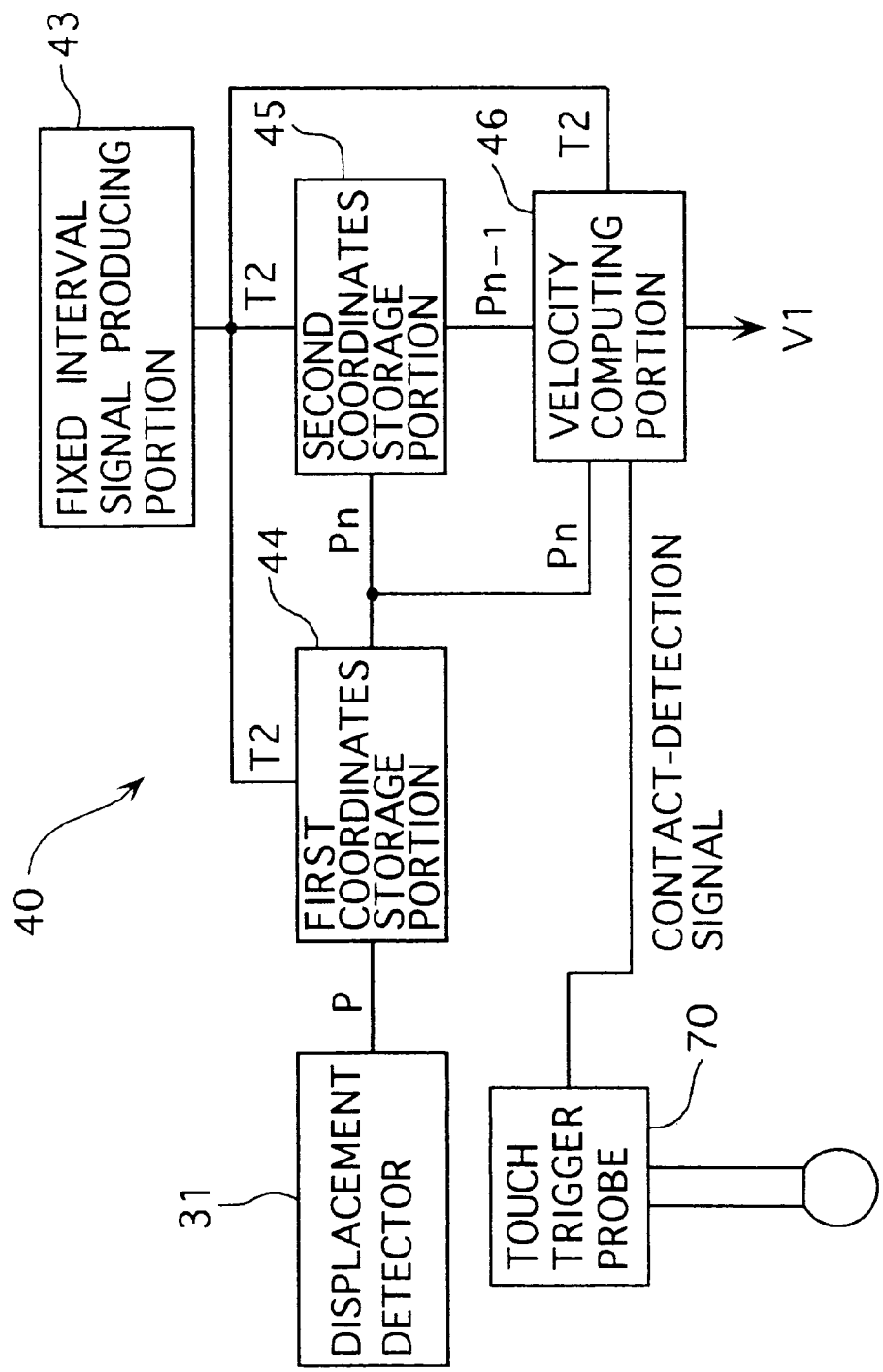
FIG. 3 is a block diagram showing another example of a velocity detecting means in the first embodiment.

In this embodiment, as the velocity detecting means 40 for detecting the velocity V1 of the touch trigger probe 70 when the contact-detection signal is output from the touch trigger probe 70, the velocity detector 41 and the velocity storage portion 42 are provided, but a structure as shown in FIG. 3 can be designed.

That is to say, the structure consists of: the displacement detector 31; a fixed interval signal producing portion 43; a first coordinates storage portion 44 which sequentially store the updating coordinate values P, detected by the displacement detector 31, at fixed intervals T2 of signals output from the fixed interval signal producing portion 43 to obtain a coordinate value $P_n$; a second coordinate storage portion 45 which stores a coordinate value $P_{n-1}$ immediately antecedent to the coordinate value $P_n$ for the fixed interval T2; and a velocity computing portion 46 which finds the velocity V1 in producing the contact-detection signal from the fixed interval T2 and the coordinate values $P_{n-}$ and $P_{n-1}$ respectively stored in the first and second coordinates storage portions 44 and 45.

Figure 4:
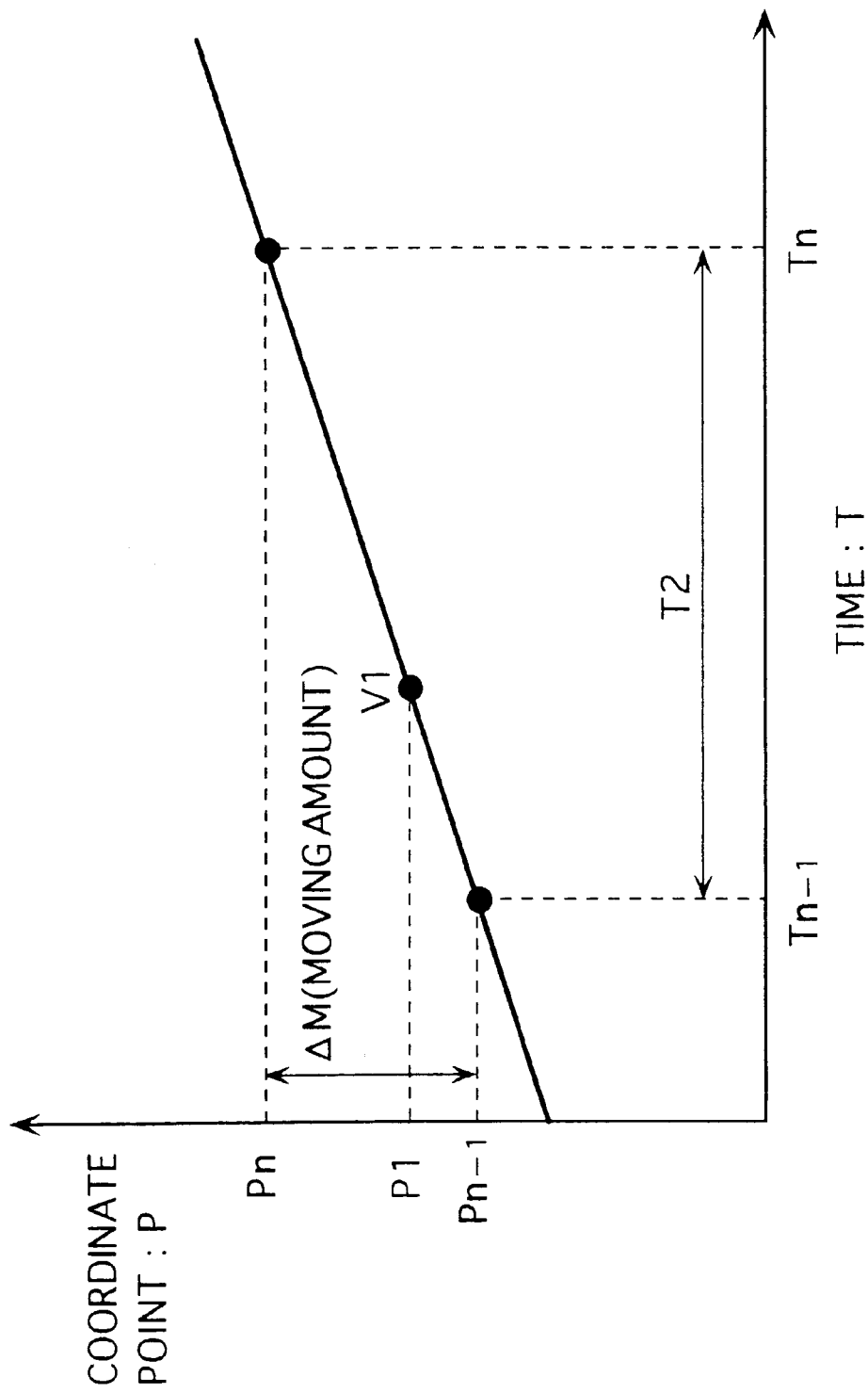
FIG. 4 is a graph for explaining the action in the velocity detecting means.

As shown in FIG. 4, in a time $T_n$ just after the contact-detection signal is generated from the touch trigger probe 70, the velocity computing portion 46 finds a mean velocity $V_n$ in producing the contact-detection signal from the coordinate value $P_n$ at the time $T_n$, the coordinate value $P_{n-1}$ at a time $T_{n-1}$ just before the contact-detection signal is generated (a time antecedent to $T_n$ for the interval T2), and the fixed intervals T2. That is to say, $$V_n = (P_n - P_{n-1})/T2$$

is found. The mean velocity $V_n$ is output as an estimated value of the velocity V1 at the time when the contact-detection signal is generated.

In this point, the values ($P_n$, $P_{n-1}$, $V_n$, and V1) used in each means and computation have a dimension corresponding to a dimension of the coordinate measuring instrument. For example, in three dimension, the following expression can be derived.

$$\begin{bmatrix} V1x \\ V1y \\ V1z \end{bmatrix} \approx \begin{bmatrix} V_n x \\ V_n y \\ V_n z \end{bmatrix} = \left( \begin{bmatrix} P_n x \\ P_n y \\ P_n z \end{bmatrix} - \begin{bmatrix} P_{n-1} x \\ P_{n-1} y \\ P_{n-1} z \end{bmatrix} \right) \cdot \frac{1}{T2} \quad \text{Expression 2}$$

Additionally, for the mean velocity $V_n$ for each time interval T2, a velocity $FV_n$ through a digital filter, $$V1 \approx FV_n = \sum_{m=0}^{a1} K_m \cdot V_{n-m} + \sum_{m=1}^{a1} FK_m \cdot FV_{n-m} \quad \text{Expression 3}$$

(a1 is a order of digital filter) can be obtained as an estimated value of the speed V1 at the time when the contact-detection signal is generated.

In the aforementioned embodiment, the natural delayed time of each touch trigger probe is stored in the elapsed time storage portion 51 in the plural, according to the type of touch trigger probe. And then, each time the touch trigger probe 70 is exchanged, the correction amount computing portion 52 may read the natural delayed time of the touch trigger probe after the replacement from the elapsed time storage portion 51 to compute the amount of correction.

According to the above design, the correction can be carried out in consideration of the elapsed time varying with a type of the touch trigger probe, thereby achieving the measurement with high accuracy.

In the aforementioned embodiment, the vibration type touch trigger probe is used, but another type touch trigger probe can be used: for example, a non-vibration measuring point contacts the object, and then the contact with the object is detected by electrically detecting the impact of the measuring point in the contact.

And additionally, in the aforementioned embodiment, only the touch trigger probe 70 moves in three-dimensional directions, but the object can be moved, alternatively the touch trigger probe 70 and the object may be moved together also.

Second Embodiment

Figure 5:
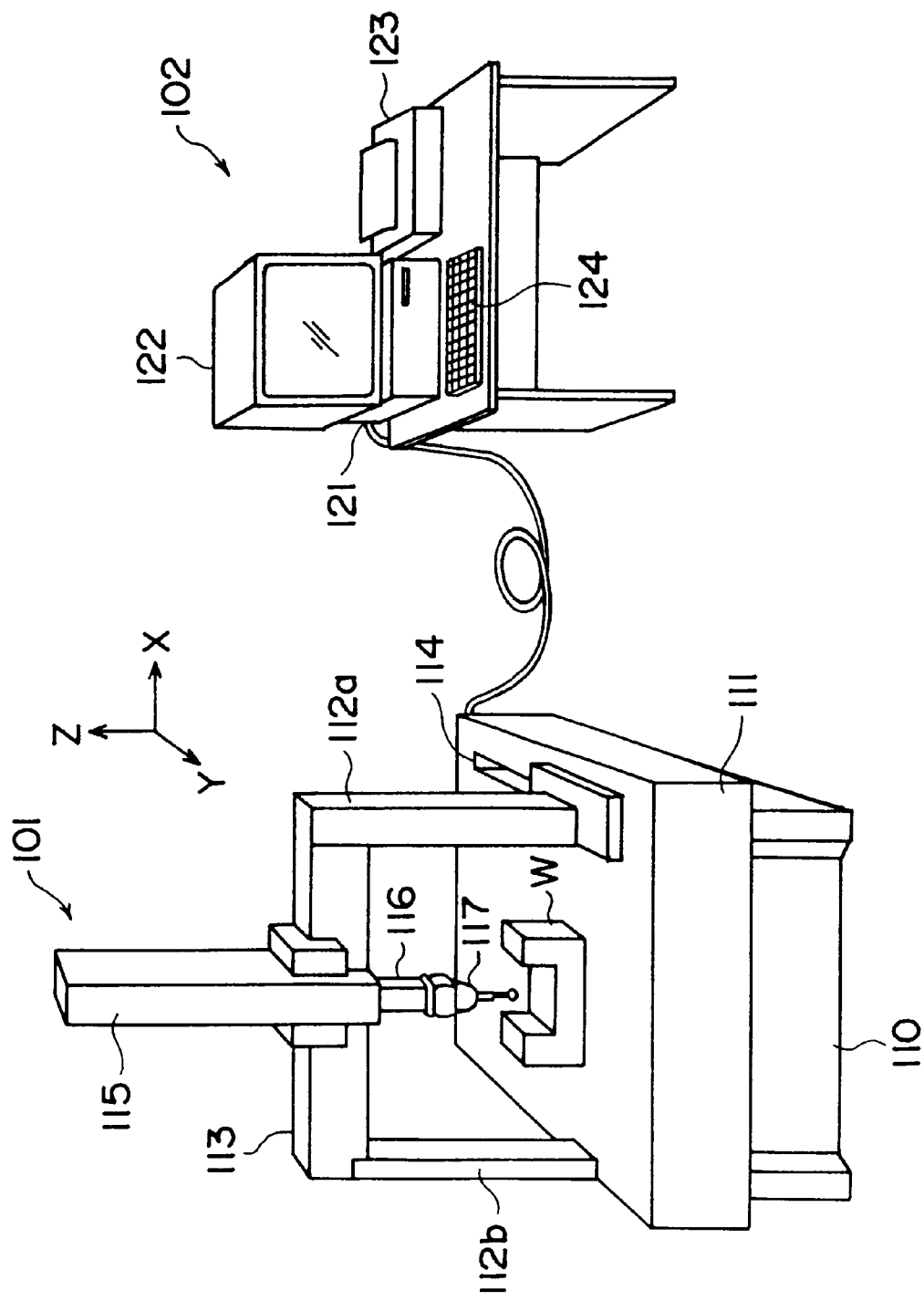
FIG. 5 is a perspective view showing a manual measure type coordinate measuring machine according to a second embodiment of the present invention.

FIG. 5 is a perspective view showing a structure of a manual coordinate measuring machine relating to the second embodiment.

The coordinate measuring machine consists of a coordinete measuring machine body 101, and a host system 102 for fetching required measurement values from the coordinete measuring machine body 101 and processing the measurement values.

The coordinate measuring machine body 101 is structured as follows. On an anti vibration platform 110, a surface plate 111 is mounted so that place the top surface thereof as a base surface for measuring is horizontal. An X-axis guide 113 is supported on the top ends of arm supporters 112a and 112b which respectively stand upright on the side ends of the surface plate 111. The arm supporter 112a is placed to move the bottom end thereof along a Y-axis guide 114 in the Y-axis direction. The arm supporter 112b is supported so that the bottom end thereof is moved in the Y-axis direction on the surface plate 111 by an air bearing.

Figure 13:
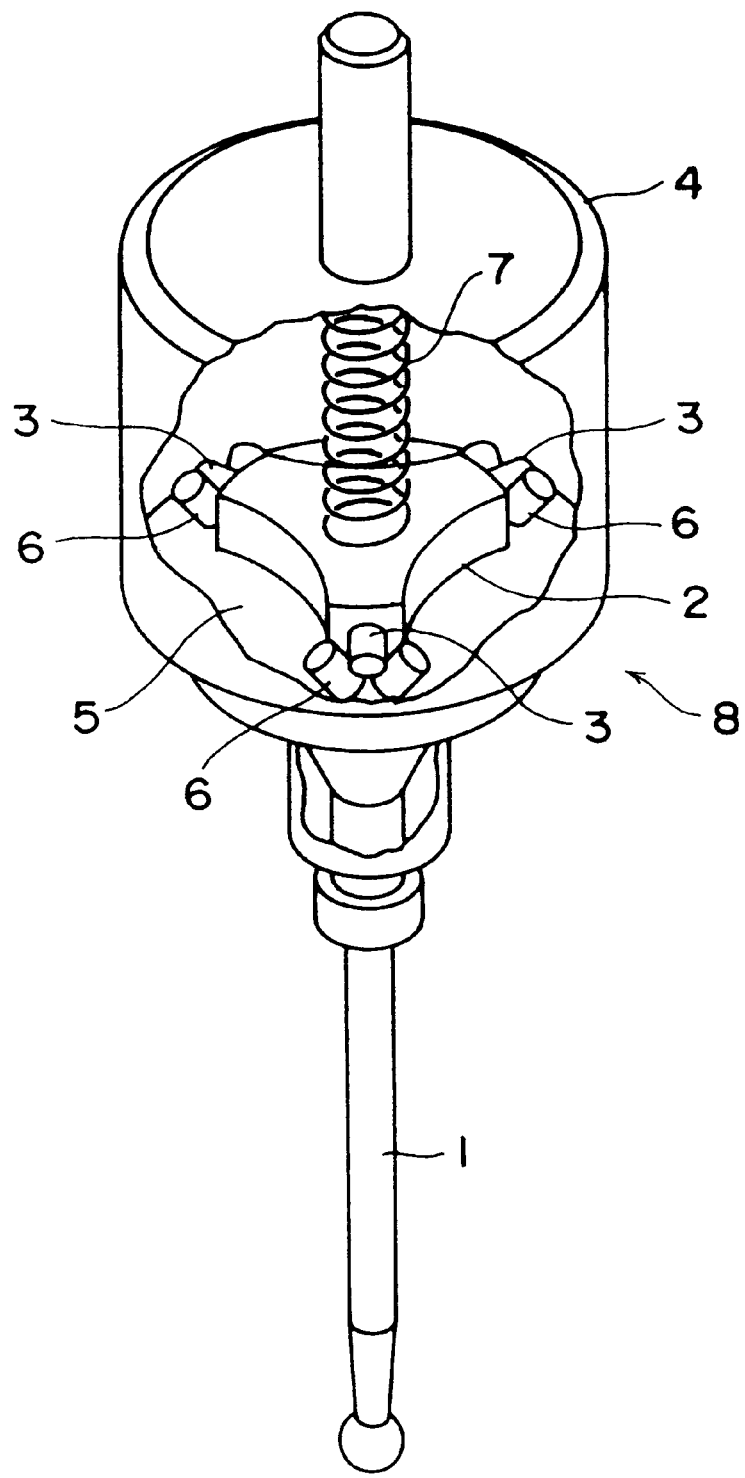
FIG. 13 is a cutaway view showing a touch trigger probe with a six-point contact type seating system.

The X-axis guide 113 guides a Z-axis guide 115, extending in the vertical direction, in the X-axis direction. In the Z-axis guide 115, a Z-axis arm 116 is provided to move along the Z-axis guide 15. A contact type touch trigger probe 117 is equipped on the lower end of the Z-axis arm 116. The touch trigger probe 117 has the same structure as that of the aforementioned touch trigger probe shown in FIG. 13. When the touch trigger probe contacts the object W put on the surface plate 112, the contact-detection signal is output from the touch trigger probe 117 to the host system 102, and then the output X-axis, Y-axis and Z-axis coordinate values are captured into the host system 102.

Figures 6, 7:
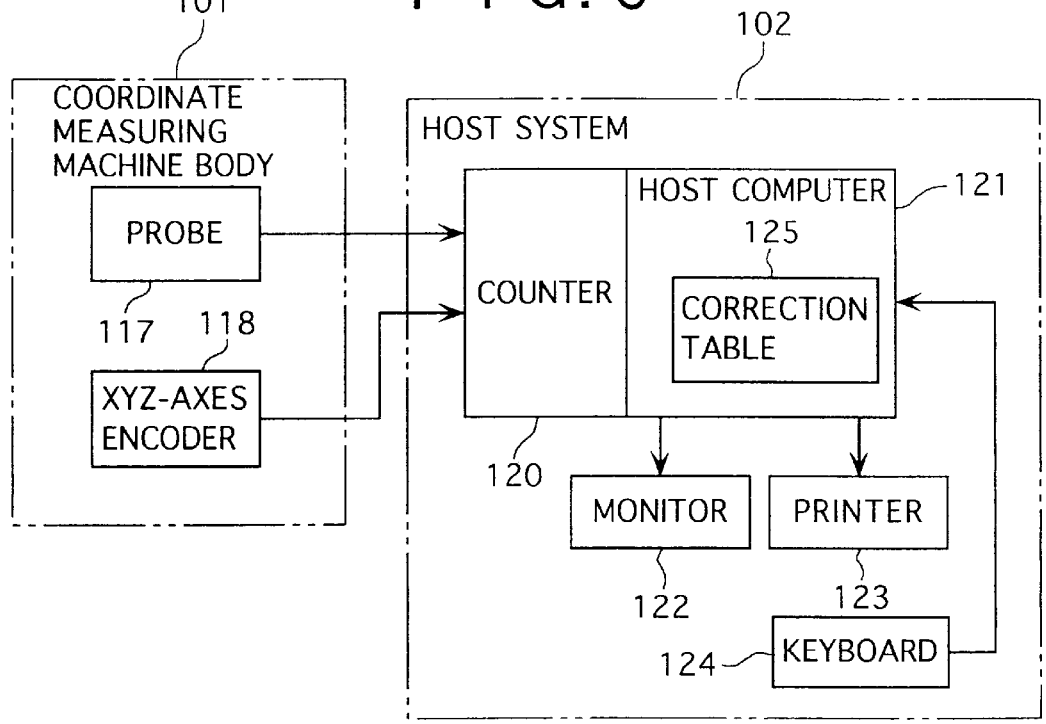
FIG. 6 is a block diagram of the second embodiment.
FIG. 7 is a chart for demonstrating a correction table in the second embodiment.

FIG. 6 is a block diagram of the above coordinate measuring machine.

The coordinate measuring machine body 101 has an XYZ-axes encoder 118 which outputs a movement indicating pules of each axis direction with the movement of the touch trigger probe 117 in the X-,Y-, and Z-axes.

The host system 102 consists of a counter 120, a host computer 121, a monitor 122, a printer 123 and a keyboard 124. The counter 120 calculates a pulse signal of each axis, output from the XYZ axes encoder 118, according to an axis, and latches the calculated value of each axis in response to the contact-detection signal output from the touch trigger probe 117 when the touch trigger probe 117 contacts the object W.

The host computer 121 inputs the calculated value latched in the counter 120, and converts it into a present coordinate value of the touch trigger probe 117. The host computer 121 detects a moving direction and a moving velocity of the touch trigger probe 117 from the calculated value in the counter 120 which is sampled at regular intervals, and additionally, detects the contact-detection signal output from the touch trigger probe 117 to detect the contact velocity at the moment of contact between the touch trigger probe 117 and the object W. The host computer 121 includes a correction table 125. The correction table 125 is configured with electrically erasable EEPROM or the like, and as shown in FIG. 7, stores the relationship between the measurement error and the contact velocity of the touch trigger probe 117 with the object W, namely, the relationship between the amount of correction and the relative moving velocity of the touch trigger probe 117 and the object W at the time when the contact-detection signal is generated, according to the type of touch trigger probe 117. In these points, the host computer 121 structures a coordinate value detecting means, a velocity detecting means and a correction means.

The following is an explanation about the action of the coordinate measuring machine structured as described above.

In the coordinate measuring machine, the touch trigger probe 117 or the Z-axis arm 116 is grasped, and the touch trigger probe 117 is moved by a hand operation so that the end ball thereof contacts each part of the object W, thereby measuring each part of the object W. The measurement error may be contributed by the contact velocity, so that the correction table 125 is determined in advance through the following processes.

The object W is secured on the surface plate 111. The touch trigger probe 117 is manually moved to come in contact with a specified face of the object W. In this state, the touch trigger probe 117 is in a free state not to deform. In the free state, each axis is fixed to determine the X-axis, Y-axis and Z-axis coordinates with precision by a well-known scale-correction means using a laser interferometer or a correction probe. When the deviation occurs between the X, Y and Z indicated values in the host system 102 and the indicated values measured with precision, the indicated values are corrected to the measured values.

Next, the touch trigger probe 117 attached to the Z-axis arm 116 repeatedly contacts on the specified face of the object W while the contact velocity is changed variously. The relationship between the contact velocity and the measured value in the above step is stored in the host computer 121. The host computer 121 finds a curve line showing the relationship between the contact velocity and the amount of deviation (error=measured value–accurately measured value), shown in FIG. 8, from the relationship between the obtained contact-velocity and the measured value by a method of least square or the like. When the curve line is found in each axis direction with respect to the type of touch trigger probe, the correction table 125, showing the relationship between the contact velocity and the amount of deviation as shown in FIG. 7, can be created from the above curve line. Note that where the relationship between the contact velocity and the amount of deviation has no dependence on the contact direction from the viewpoint of the structure of the touch trigger probe 117, the amount of deviation is not needed to be determined in each axis.

Figure 9:
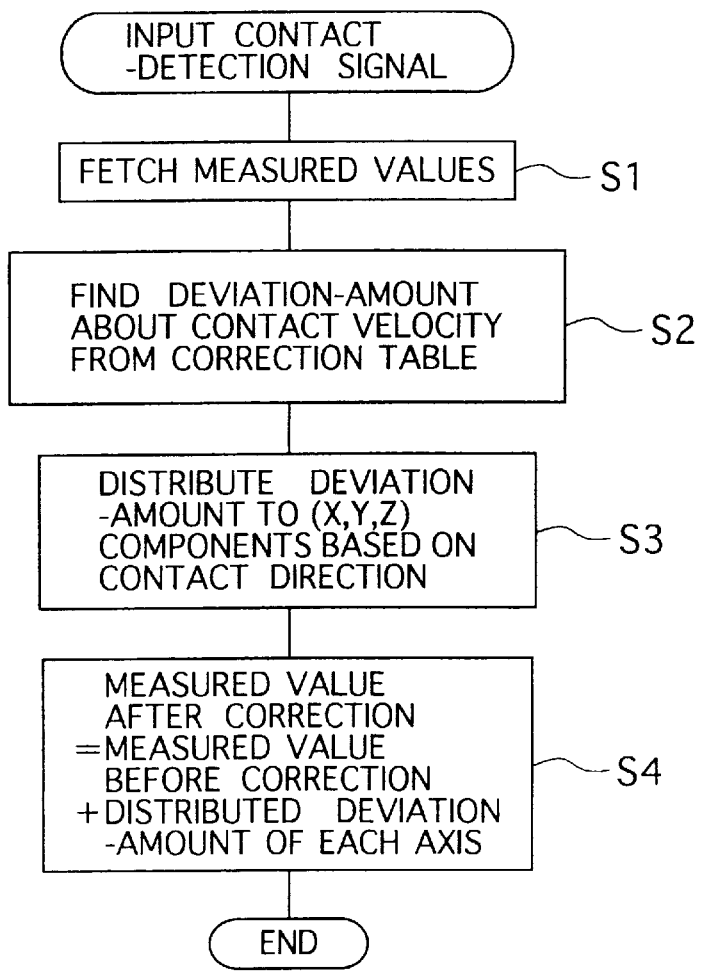
FIG. 9 is a flow chart showing a correcting process in the measurement in the second embodiment.

FIG. 9 is a flow chart showing processes of the host computer 121 in the actual measurement.

The contact-detection signal is input from the touch trigger probe 117, whereupon the measured values (X-axis, Y-axis and Z-axis coordinate values) at the time of inputting the contact-detection signal are fetched (S1). The amount of deviation with respect to the contact velocity is determined from the correction table 125 (S2). In this time, for example, when the contact velocity is 1.3 mm/s and the contact velocity registered in the correction table 125 is 0.5, 1.0, 1.5, . . . mm/s, the amount of deviation is calculated from the amount of deviation of 1.0 mm/s and 1.5 mm/s in the correction table 125 by, for example, linear interpolation.

As shown in FIG. 7, where the amount of deviation of each axis direction is stored in advance, after the contact directions of the touch trigger probe 117 are dissolved in each axis, the contact velocity in each axis direction is calculated, and then the amount of deviation is determined with respect to each of the calculated contact-velocities. Where the moving direction and the relationship between the contact velocity and the amount of deviation have no dependence, the determined amount of deviation is distributed to the component of each axis (of X-, Y- and Z-axes) direction on the basis of the contact direction (S3). The value as a result of addition (or subtractions) of the fetched measured value before correction and the amount of deviation of each axis is found as the measured value after the correction (S4). That is to say, the amount of deviation of each axis as the amount of correction is added to (or subtracted from) the measured value before correction. Thereby achieving the accurate measurement independent of the contact velocity.

Third Embodiment

Figure 10:
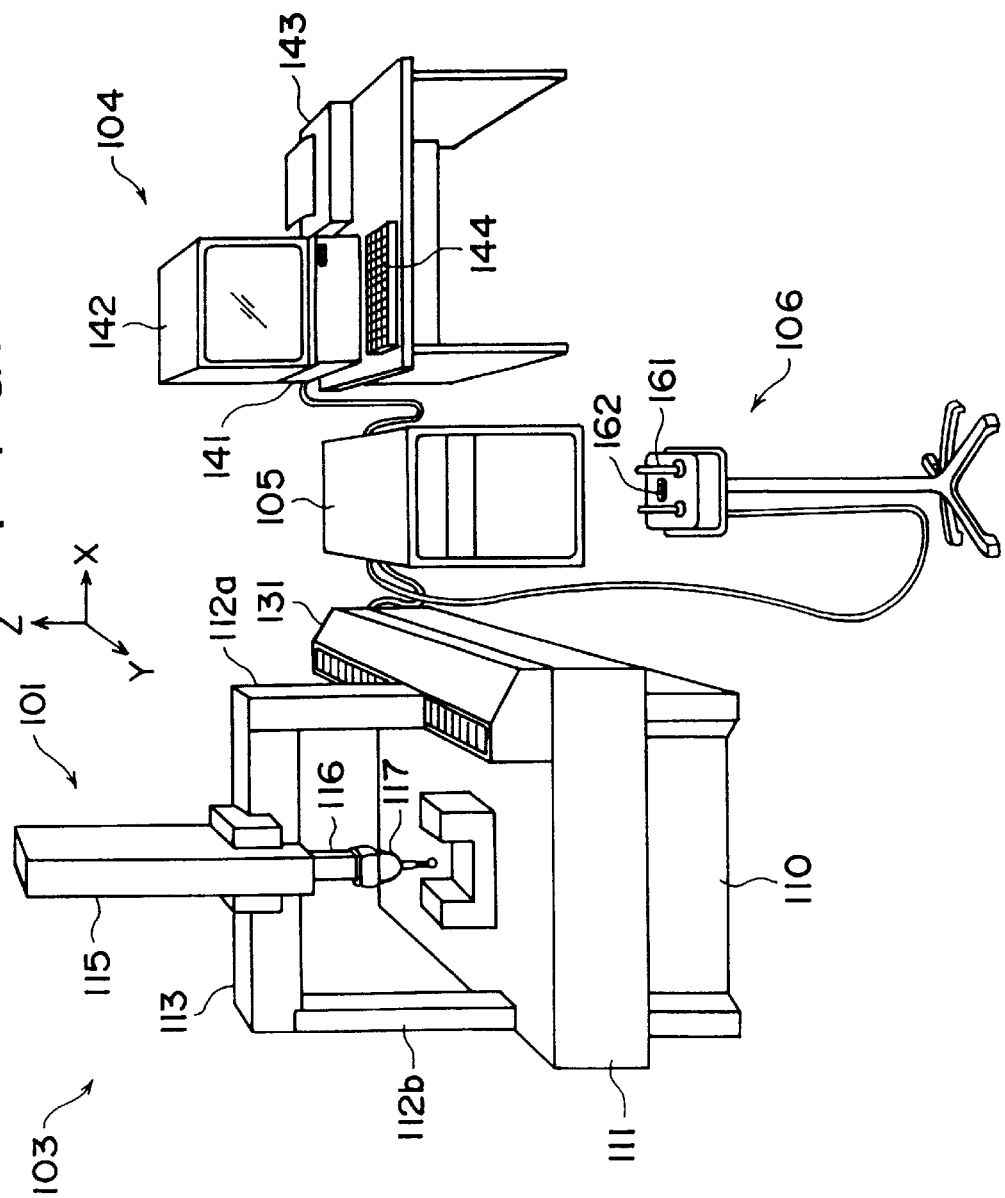
FIG. 10 is a perspective view showing a CNC coordinate measuring machine according to a third embodiment of the present invention.

FIG. 10 shows an example when the present invention is applied to a CNC coordinate measuring machine.

The coordinate measuring machine is provided with: a coordinate measuring machine body 103; a host system 104; a controller 105 for controlling the driving of the coordinate measuring machine body 103 and fetching the necessary measured values from the coordinate measuring machine body 103; and a console panel 106 for manually controlling the coordinate measuring machine body 103 via the controller 105.

In the CNC measuring instrument, except for a point that the manual type coordinate measuring machine body 101 shown in FIG. 5 has the driving system for each axis, the basic structure of the coordinate measuring machine 103 is similar to the structure of the coordinate measuring machine 101 in FIG. 5, so that the same reference numerals will be used to designate the parts corresponding to the coordinate measuring machine 101, and the description will be omitted or simplified.

The lower end of the arm supporter 112a is driven in the Y-axis direction by a Y-axis driving system 131. The X-axis guide 113 drives the Z-axis guide 115, extending in the vertical direction, in the X-axis direction. The Z-axis arm 116 is provided in the Z-axis guide 115 to be driven along the Z-axis guide 115.

Figure 11:
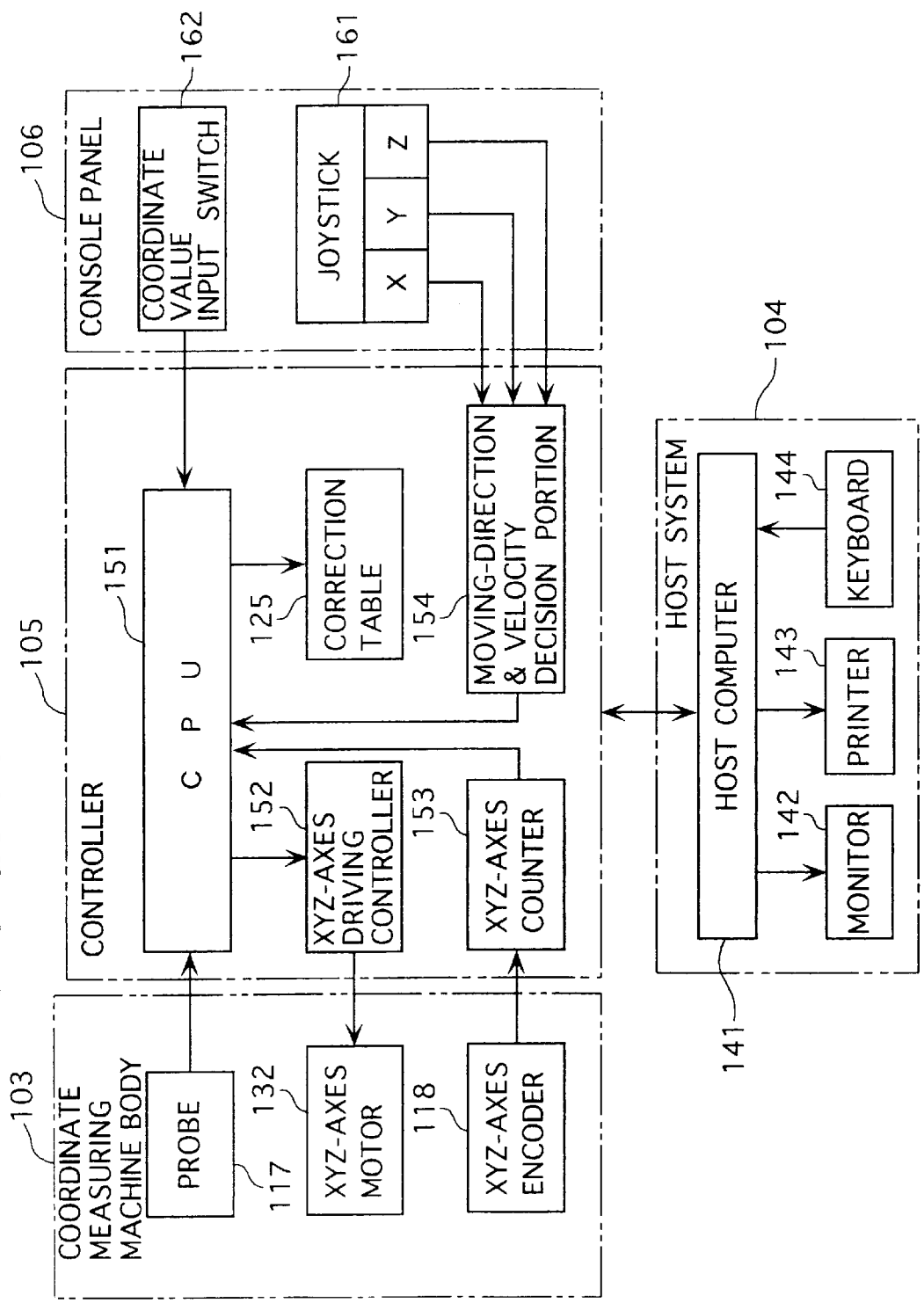
FIG. 11 is a block diagram of the third embodiment.

FIG. 11 is a block diagram of this coordinate measuring machine.

The coordinate measuring machine body 103 has an XYZ-axes motor 132 for driving the touch trigger probe 117 in the X-axis, Y-axis and Z-axis directions.

The console panel 106 is provided thereon with a joystick 161for driving the touch trigger probe 117 of the coordinate measuring machine body 103 in the X-axis, Y-axis and Z-axis directions by a hand operation, and a coordinate value input switch 162 for inputting the X-axis, Y-axis and Z-axis coordinates of the present position of the touch trigger probe 117 into the controller 105.

A CPU 151 is provided in the controller 105 to perform the driving control of the probe 117, the fetching control of the calculated values and so on. More specifically, an XYZ-axes driving controller 152 drives the XYZ-axes motor 132 of the coordinate measuring machine body 103 on the basis of the instruction of the CPU 151, and additionally an XYZ-axes counter 153 counts pulse signals, corresponding to each axis, output from the XYZ-axes encoder 118 to find the present position and send it as feedback to the CPU 151. The CPU 151 controls the driving of the touch trigger probe 117 on the basis of the feedback information. The CPU 151 stops the XYZ-axes motor 132 in response to the contact-detection signal from the touch trigger probe 117.

A voltage value of a potentiometer, which corresponds to each axis and responds to a tilt angle and a tilting direction of the joystick 162, is output from the console panel 106. A moving-direction and velocity deciding portion 154 of the controller 105 decides the moving direction and the moving velocity of the probe 117 in response to the above voltage value of each axis.

The aforementioned correction table 125 is provided in the controller 105.

In the embodiment, the CPU 151 corrects the measured value, fetched in the CPU 151, to read the correction table 125 on the basis of the contact direction and the contact velocity of the touch trigger probe 117 and the object W, so that the measurement can be achieved with high precision even in an automatic measurement for a small hole where a sufficient contact velocity is not available, or the manual measurement using the console panel 106.

Figure 12:
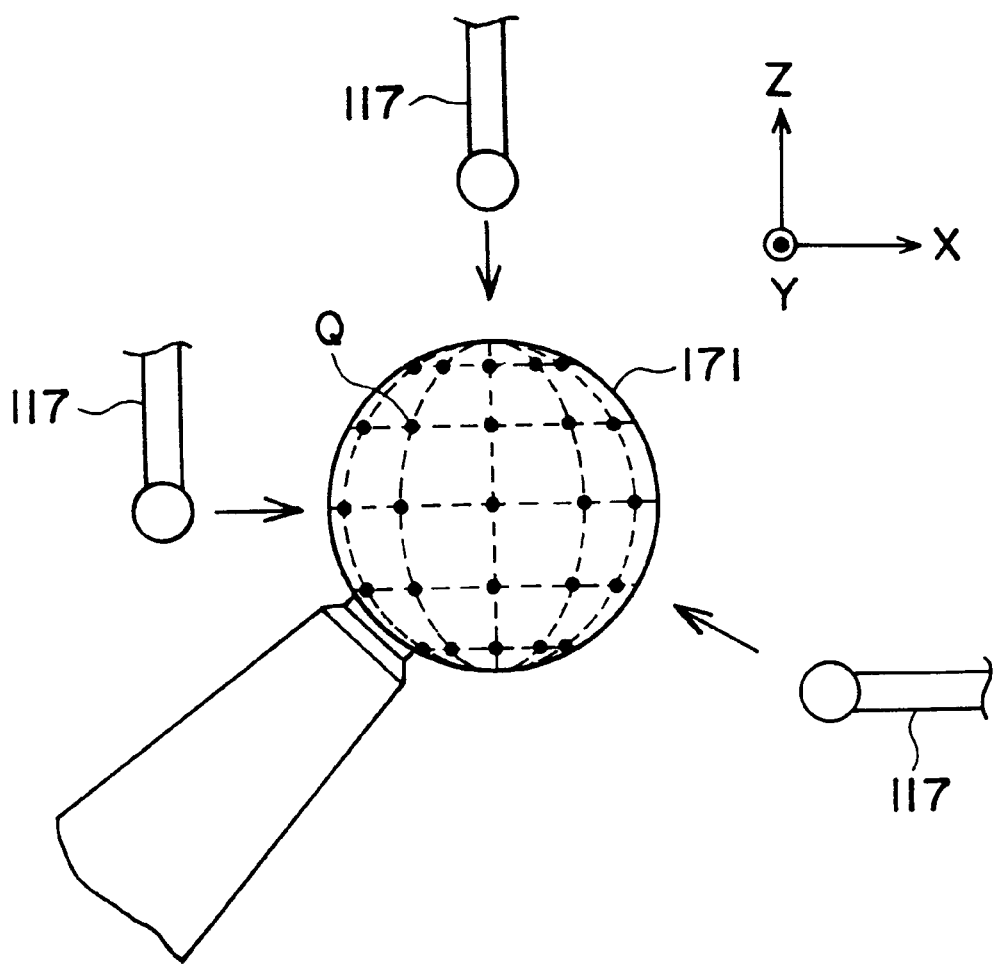
FIG. 12 is an explanatory view for a creating process of the correction table.

The correction table 125 can be also created by the following method. FIG. 12 shows the explanation of the creating method.

In the CNC coordinate measuring machine, the following method is adopted.

1) As shown in FIG. 12, after a master ball 171, which has a diameter known previously, is attached to the surface plate 111 of the coordinate measuring machine body 103 and the touch trigger probe 117 performing the measurement is attached, the probe information, such as a probe number, is input in the controller 105.
2) The coordinates of a tentative center of the master ball 171 is found by measuring the master ball 171 from multi-points (e.g., four points) with the touch trigger probe 117.
3) Looking at the master ball 171 from the positive Z-axis direction, the master ball 171 is divided at, for example, 30 degrees from the tentative center. Additionally, looking each of the cross-sections from a direction perpendicular to the cross-section, the cross-section is divided at 30 degrees from the tentative center. A point of intersection of each divided line and the surface of the master ball 171 is computed by a host computer 141, and is defined as a grid point Q of the master ball 171. Incidentally, in this example, the number of grid points Q is 62, but when the number of grid points Q is larger, the accuracy of the measurement is improved.
4) The touch trigger probe 117 is moved in a direction from each grid point Q to the tentative center. The coordinates of each grid point Q are measured in the normal contact velocity (e.g., 5 mm/s). The center of the master ball 171 is found again from the obtained coordinates of each grid point Q, and is defined as the actual center.
5) The touch trigger probe 117 is moved in a direction from each grid point Q to the actual center, and the coordinates of the grid point Q is measured. In this point, the contact velocity is changed, for example, in increments of 0.1 mm/s in the approximate range from 0.1 mm/s to 50 mm/s with respect to the identical grid point Q, and the coordinates of each gird point are found in each contact velocity.
6) The difference between a distance from each grid point Q in each found contact velocity to the actual center and a distance from each grid point Q in the normal contact velocity to the actual center is found and registered as the amount of deviation in each contact velocity.
7) The aforementioned steps 1) to 6) are repeated for all touch trigger probes 117, whereby the correction table 125, showing the relation of the deviation amount to the probe information, the contact direction and the contact velocity, can be created.

In the manual coordinate measuring machine, the contact direction cannot be defined in multi directions and the touch trigger probe 117 cannot contact the object at a specific velocity, so that the correction table 125 is created as follows.

1) The center of the master ball 171 is found by the multi-point measurement (it is recommended to define a larger number of points for measuring).
2) Referring to the YZ coordinates of the obtained center, the touch trigger probe 117 is moved only in the X-axis direction by fixing the Y-axis arm supporters 112a and 112b and the Z-axis arm 116, and is allowed to come in contact with the master ball 171 at various speeds.
3) Similarly, the measurements with respect to the Y-axis and the Z-axis are also carried out.
4) The difference between the length from the obtained measured value to the center and the (known) radius of the master ball 171 is found as the amount of deviation.

Figure 8:
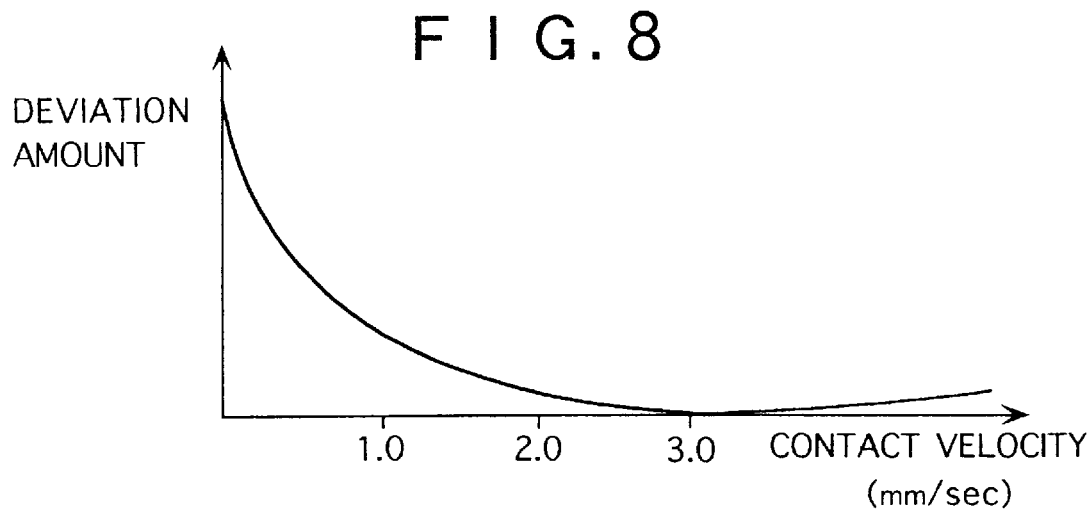
FIG. 8 is a graph showing a relationship between a contact velocity and the amount of deviation in the second embodiment.

The contact velocity can be found from the output of the XYZ-axes encoder 118 which is input in a time series, so that the curve line showing the relationship between the contact velocity and the amount of deviation, as shown in FIG. 8, is found from the relationship between the contact velocity and the amount of deviation which are found in this step. And then, the correction table 125 is created on the basis of this curve line.

According to this method, the correction table 125 can be created with precision without using the laser interferometer or the like.

As a substituting way for creating the correction table 125 as described in the second and third embodiments, the relationship between the contact velocity (the relative moving velocity) of the touch trigger prove 117 and the object and the amount of deviation (the amount of correction) derived from this contact velocity is stored as a function in a storage means in advance. And, the amount of deviation (the amount of correction) is found to substitute the contact velocity (the relative moving velocity at the time when the contact-detection signal is generated) into the function by a computing means. And then, the relative moving coordinate value at the time when the contact-detection signal is generated may be corrected with this amount of deviation.

In this connection, an example of the function is the amount of deviation=$(C-\text{the contact velocity})^2$ at the contact velocity $\leq C$. The way as described above effects the simpler and more inexpensive structure as compared with that using the correction table.

In the second and third embodiments, the structure in which only the touch trigger probe is moved in the three-dimensional directions is described, but the object W can be moved, alternatively both of them (the touch trigger probe 117 and the object W) may be moved.

In the first embodiment to third embodiment, the structure in which the touch trigger probe and the object are moved in the three-dimensional directions is described, but the touch trigger probe and the object may be relatively moved in a one-dimensional direction or two-dimensional directions.

The case where the touch trigger probe is used is explained in the first to third embodiments, but a non-contacting probe can be used. For example, the non-contacting probe, which has an optical displacement sensor for moving an objective lens close to and apart from a measured face of the object to focus a focal point of the objective lens on the measured face, or the non-contacting probe of a camera or the like, can be used when the size of the object is measured.

In the first to third embodiment, the measurement of the size or configuration of the object is described, but the surface shape of the object, such as roughness, swell, and configuration (outline or roundness), can be measured from the determined coordinate values.

As described thus far, according to the measuring method and the measuring instrument of the present invention, even in the complicated measurement which requires changing the measuring velocity in response to the substance of measuring, the biased error caused by the measuring velocity is corrected, and additionally the high-accurate and efficient measurement is achieved.

What is claimed is:

1. A method of measuring the size or shape of an object with an apparatus for moving a non-contacting probe relative to the object, said probe producing a position-detection signal upon reaching a fixed proximate relation with the object, there being a natural elapsed time between the instant when the fixed proximate relation is reached and the generation of the position-detection signal, there being means for recording a coordinate value of the probe and the relative velocity of the probe and object comprising the steps of:

a) storing the natural elapsed time;

b) detecting the coordinate value of the probe in response to the position-detection signal;

c) detecting the relative velocity of the probe and object in response to the position-detection signal; and d) correcting the coordinate value by computing a correction from the natural elapsed time and the relative velocity.

2. A method of measuring the size or shape of an object with an apparatus for moving a contacting probe relative to the object, said probe producing a position-detection signal upon contact with the object, there being a natural elapsed time between the instant of contact and the generation of the position-detection signal, there being means for recording a coordinate value of the probe and the relative velocity of the probe and object comprising the steps of:

a) storing the natural elapsed time;

b) detecting the coordinate value of the probe in response to the position-detection signal;

c) detecting the relative velocity of the probe and object in response to the position-detection signal; and d) correcting the coordinate value by computing a correction from the natural elapsed time and the relative velocity.

3. The method according to claim 1 or 2, wherein in step b) two- or three-dimensional coordinate values are detected;

wherein the relative velocity detected in step c) has a plurality of vector components; and wherein the coordinate values detected at the time the position-detection signal is generated are corrected with the natural elapsed time and each vector component value of relative velocity.

4. The method according to claim 3, wherein the natural elapsed time of the probe is stored according to the type of probe in advance; and wherein the amount of correction is computed with the natural elapsed time of the probe each time the probe is changed.

5. The method according to claim 3, wherein the relationship between the relative velocity of the probe and the object and the amount of correction derived from the relative velocity is stored in a correction table in advance of the measuring; and wherein the amount of correction corresponding to the relative velocity at the time the position-detection signal is generated is found from the correction table.

6. The method according to claim 5, wherein the amount of correction is generated by means for interpolation from values found in the correction table.

7. The method according to claim 1 or 2, wherein the amount of correction is approximated with a function in advance and the amount of correction is found by substituting the velocity value determined in step c) into the function at the time the position-detection signal is generated.

8. The method according to claim 1 or 2, wherein the coordinate value of the probe is detected and stored at regular time intervals; and wherein the velocity of the probe at the time of the position-detection signal is estimated from the regular time intervals and more than two coordinate values.

9. In an instrument for measuring the size or shape of an object comprising a non-contacting probe positionable relative to the object, said probe having means for producing a position-detection signal upon reaching a fixed proximate relation with the object, there being a natural elapsed time between the instant when the fixed proximate relation is reached and the generation of the position-detection signal, the improvement comprising:

a) means for storing the natural elapsed time;

b) means for detecting at least one coordinate value of the probe in response to the position-detection signal;

c) means for detecting the relative velocity of the probe and object in response to the position-detection signal; and d) means for correcting the at least one coordinate value by computing a correction from the natural elapsed time and the relative velocity.

10. In an instrument for measuring the size or shape of an object comprising a contacting probe positionable relative to the object, said probe producing a position-detection signal upon contact with the object, there being a natural elapsed time between the instant of contact and the generation of the position-detection signal, the improvement comprising:

a) means for storing the natural elapsed time;

b) means for detecting at least one coordinate value of the probe in response to the position-detection signal;

c) means for detecting the relative velocity of the probe and object in response to the position-detection signal; and d) means for correcting the at least one coordinate value by computing a correction from the natural elapsed time and the relative velocity.

11. The instrument according to claim 9 or 10, wherein two- or three-dimensional coordinate values are detected;

wherein the relative velocity detected has a plurality of vector component values; and wherein the coordinate values detected at the time the position-detection signal is generated are corrected with the natural elapsed time and each vector component value of relative velocity.

12. The instrument according to claim 11, wherein the natural elapsed time of the probe may be stored according to the type of probe in advance; and wherein the amount of correction is computed with the natural elapsed time of the probe each time the probe is changed.

13. The instrument according to claim 11, wherein the relationship between the relative velocity of the probe and the object and the amount of correction derived from the velocity may be stored in a correction table in advance of the measuring; and wherein the amount of correction corresponding to the relative velocity at the time the position-detection signal is generated is found from the correction table.

14. The instrument according to claim 13, wherein the amount of correction is generated by means for interpolation from values found in the correction table.

15. The instrument according to claim 9 or 10, wherein the amount of correction is approximated with a function in advance and the amount of correction is found by means for substituting the velocity value into the function at the time the position-detection signal is generated.

16. The instrument according to claim 9 or 10, wherein the coordinate value of the probe is detected and stored at regular time intervals; and wherein the velocity of the probe at the time of the position-detection signal is estimated from the regular time intervals and more than two coordinate values.

* * * * *

UNITED STATES PATENT AND TRADEMARK OFFICE
CERTIFICATE OF CORRECTION

PATENT NO. : 6,044,569
DATED : April 4, 2000
INVENTOR(S) : Motonori Ogihara et al.

It is certified that error appears in the above-identified patent and that said Letters Patent is hereby corrected as shown below:

Title page,
Assignee, "Tokyo, Japan" should read --Kawasaki, Japan--.

Title page,
References Cited, FOREIGN PATENT DOCUMENTS, last reference: "WO9220096" should read --WO9220996--.

Column 1,
Line 45, "portion 6" should read --portions 6--.

Column 2,
Line 21, "is send" should read --is sent--.
Line 25, before "to the" delete "it".

Column 3,
Line 9, "an coordinate" should read --a coordinate--.
Line 30, "of the prove" should read --of the probe--.
Line 34, "of the prove" should read --of the probe--.

Column 4,
Line 25, "of the prove" should read --of the probe--.

Column 5,
Line 25, "trigger prove" should read --trigger probe--.
Line 50, "signal" should read --signals--.

Column 10,
Line 60, "store" should read --stores--.

Column 11,
Line 36, "is a order" should read --is an order--.

Column 12,
Line 1, "coordinete" should read --coordinate--.
Line 5, "anti vibration" should read --anti-vibration--.
Line 6, after "so that" delete "place".

UNITED STATES PATENT AND TRADEMARK OFFICE
CERTIFICATE OF CORRECTION

PATENT NO.    : 6,044,569
DATED         : April 4, 2000
INVENTOR(S)   : Motonori Ogihara et al.

It is certified that error appears in the above-identified patent and that said Letters Patent is hereby corrected as shown below:

Column 13,
Line 57, "subtractions" should read --subtraction--.
Lines 62-63 "after correction. Thereby" should read --before correction thereby--.

Column 14,
Line 28, "161for" should read --161 for--.

Column 15,
Line 14, "looking each" should read --looking at each--.
Line 36, "gird point" should read --grid point--.

Column 16,
Line 15, "trigger prove" should read --trigger probe--.

Signed and Sealed this

Fourteenth Day of August, 2001

*Attest:*

*Attesting Officer*

NICHOLAS P. GODICI
*Acting Director of the United States Patent and Trademark Office*